(12) United States Patent
Barr et al.

(10) Patent No.: US 12,351,170 B2
(45) Date of Patent: Jul. 8, 2025

(54) VEHICLE CONTROL SYSTEM

(71) Applicant: Transportation IP Holdings, LLC, Norwalk, CT (US)

(72) Inventors: Stuart Barr, Cedar Rapids, IA (US); Andrew Ryan Staats, Cedar Rapids, IA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 376 days.

(21) Appl. No.: 17/471,306

(22) Filed: Sep. 10, 2021

(65) Prior Publication Data

US 2023/0084708 A1 Mar. 16, 2023

(51) Int. Cl.
*B60W 30/14* (2006.01)
*B60W 40/06* (2012.01)
*B60W 40/105* (2012.01)
*B60W 40/13* (2012.01)

(52) U.S. Cl.
CPC .......... *B60W 30/143* (2013.01); *B60W 40/06* (2013.01); *B60W 40/105* (2013.01); *B60W 40/13* (2013.01); *B60W 2520/26* (2013.01); *B60W 2520/28* (2013.01); *B60W 2555/20* (2020.02); *B60W 2556/10* (2020.02); *B60W 2556/45* (2020.02)

(58) Field of Classification Search
CPC .... B60W 40/13; B60W 40/105; B60W 40/06; B60W 30/143; B60W 2556/10; B60W 2556/45; B60W 2555/20; B60W 2520/26; B60W 2520/28
See application file for complete search history.

(56) References Cited

U.S. PATENT DOCUMENTS

| | | | |
|---|---|---|---|
| 2013/0204504 A1* | 8/2013 | Bieniek | B60T 8/4809 701/82 |
| 2015/0298666 A1* | 10/2015 | Liu | B60T 8/245 701/74 |
| 2019/0129435 A1* | 5/2019 | Madsen | G05D 1/0274 |
| 2022/0153274 A1* | 5/2022 | Henderson | B60L 3/10 |
| 2023/0106644 A1* | 4/2023 | Shenfeld | B60W 50/14 701/26 |

* cited by examiner

*Primary Examiner* — Jaime Figueroa
*Assistant Examiner* — Zachary Joseph Wallace
(74) *Attorney, Agent, or Firm* — K&L Gates LLP

(57) ABSTRACT

A controller may be configured to receive one or more measured rotational speeds of a wheel of a vehicle. The controller may be configured to determine whether the one or more measured rotational speeds are unreliable relative to one or more previous rotational speeds of the wheel of the vehicle. The controller may be configured to calculate a replacement rotational speed of the wheel and use the replacement rotational speed of the wheel to control or restrict movement of the vehicle using or based on the replacement rotational speed in place of the one or more measured rotational speeds.

20 Claims, 3 Drawing Sheets

VEHICLE CONTROL SYSTEM

BACKGROUND

Technical Field

The subject matter described herein relates to control systems and methods that determine vehicle speeds and control movement of vehicles based on the speeds that are determined.

Discussion of Art

Many vehicles include sensors that measure speeds of the vehicles. For example, tachometers measure how rapidly vehicle wheels rotate. Given a known or measured wheel size, speeds of the vehicle can be calculated using the rotational speeds of the wheels that are measured. With increasing automated control or restrictions on vehicle movements, accurately determining vehicle speeds becomes more important.

For example, fully or partially autonomous vehicles may need to accurately determine vehicle speeds to allow control systems onboard the vehicles to prevent the vehicles from moving too rapidly. With respect to rail vehicles, onboard components of vehicle control systems may need to know the speeds of rail vehicles to ensure compliance with movement authorities, speed restrictions, etc. Examples of vehicle control systems may include positive train control (PTC) systems (e.g., interoperable electronic train management systems, or I-ETMS, available from Wabtec Corporation) and energy management systems (e.g., TRIP OPTIMIZER system, available from Wabtec Corporation).

Various events can interfere with the sensors or systems that determine vehicle speeds. For example, a wheel of a vehicle may slip relative to a surface of the route being traveled by the vehicle. This can cause the tachometer to measure a much faster wheel rotation (for the wheel that has slipped) than other wheels. As a result, the vehicle speed that is calculated using the faster rotation of the slipping wheel may be calculated to be much faster than the vehicle is actually moving.

As another example, a wheel of a vehicle may slide along the route surface, which can cause the tachometer to measure a much slower wheel rotation (for the wheel that slides on the route surface) than other wheels. As a result, the vehicle speed that is calculated using the slower rotation (or no rotation) of the slipping wheel may be calculated to be much slower than the vehicle is actually moving.

In either scenario, the vehicle speed that is calculated is inaccurate. This can cause undesirable situations with the vehicle. With respect to autonomous vehicles (fully or partially autonomous), the control systems may quickly slow or stop the vehicles based on incorrectly calculated fast speeds (caused by wheel slip). This can present an undesirable situation. It may cause collisions between the vehicle any and other vehicles behind the slowing or stopping vehicle. The control systems may quickly speed up the vehicles based on incorrectly calculated slow speeds (caused by wheel slide). This can present an undesirable situation in that the vehicles may travel at undesirable speeds. With respect to rail vehicles, the PTC systems may require several sources of calculated or measured speeds, including the tachometer output. If the speeds are inconsistent or inaccurate (e.g., the speeds based on tachometer output are significantly faster or slower than the speeds based on other information, such as output from a global navigation satellite system (GNSS) receiver), then the PTC systems may deactivate or no longer restrict movement of the rail vehicle. This can pose a risk as the rail vehicle may no longer be governed by the movement authorities, speed restrictions, etc. provided by the PTC systems. It may be desirable to have a way to measure vehicle speeds for controlling movements of the vehicle systems.

BRIEF DESCRIPTION

In one embodiment, a system is provided that includes a controller that may be configured to receive one or more measured rotational speeds of a wheel of a vehicle. The controller may be configured to determine whether the one or more measured rotational speeds are unreliable relative to one or more previous rotational speeds of the wheel of the vehicle. The controller may be configured to calculate a replacement rotational speed of the wheel and use the replacement rotational speed of the wheel to control or restrict movement of the vehicle using or based on the replacement rotational speed in place of the one or more measured rotational speeds.

In one embodiment, a method includes determining whether the one or more measured rotational speeds are unreliable relative to one or more previous rotational speeds of the wheel of the vehicle, calculating a replacement rotational speed of the wheel, and controlling or restricting movement of the vehicle using or based on the replacement rotational speed in place of the one or more measured rotational speeds that were determined to be unreliable.

In one embodiment, another system includes a controller that may be configured to receive one or more measured rotational speeds of a wheel of a vehicle. The controller may be configured to determine whether a deviation between the one or more measured rotational speeds and one or more previous rotational speeds of the wheel of the vehicle exceeds a threshold. The controller may be configured to calculate a replacement rotational speed of the wheel and use the replacement rotational speed of the wheel to automatically control or restrict movement of the vehicle using or based on the replacement rotational speed in place of the one or more measured rotational speeds that were determined to be unreliable.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to vehicle control systems and methods that estimate or predict vehicle speeds to prevent or reduce instances in which movement of vehicles is changed based on incorrect or inaccurate vehicle speeds. While one or more embodiments are described in connection with a rail vehicle system, not all embodiments are limited to rail vehicle systems. Unless expressly disclaimed or stated otherwise, the inventive subject matter described herein extends to multiple types of vehicle systems. These vehicle types may include automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together as a group. Vehicle groups may be referred to as a convoy, consist, swarm, fleet, platoon, and train.

The vehicle control systems and methods can repeatedly measure wheel speeds and, responsive to one or more wheels speeds significantly changing, the vehicle control systems and methods can estimate or predict the significantly changed wheel speeds and use the estimated or predicted wheels speeds to control movement of the vehicle(s). For example, the vehicle control systems and methods can repeatedly sample output from a tachometer coupled with a wheel of a vehicle. If the output from the tachometer increases or decreases by more than a threshold amount (e.g., changes by more than 10%, more than 20%, more than 25%, or more than 33% in different embodiments), then the control system or method can determine that a wheel slip event (e.g., significant increase in speed by more than the threshold amount) or wheel slide event (e.g., significant decrease in speed by more than the threshold amount) has occurred. Instead of using the erroneous rotational speed caused by wheel slip or wheel slide to calculate the moving speed of the vehicle, the control system or method can estimate the rotational speed of the wheel and/or the moving speed of the vehicle based on prior measurements of the rotational speed of the wheel (prior to the wheel slip event or the wheel slide event). As another example, the control system or method can use a predictive model to predict the rotational speed of the wheel and/or the moving speed of the vehicle.

Figure 1:
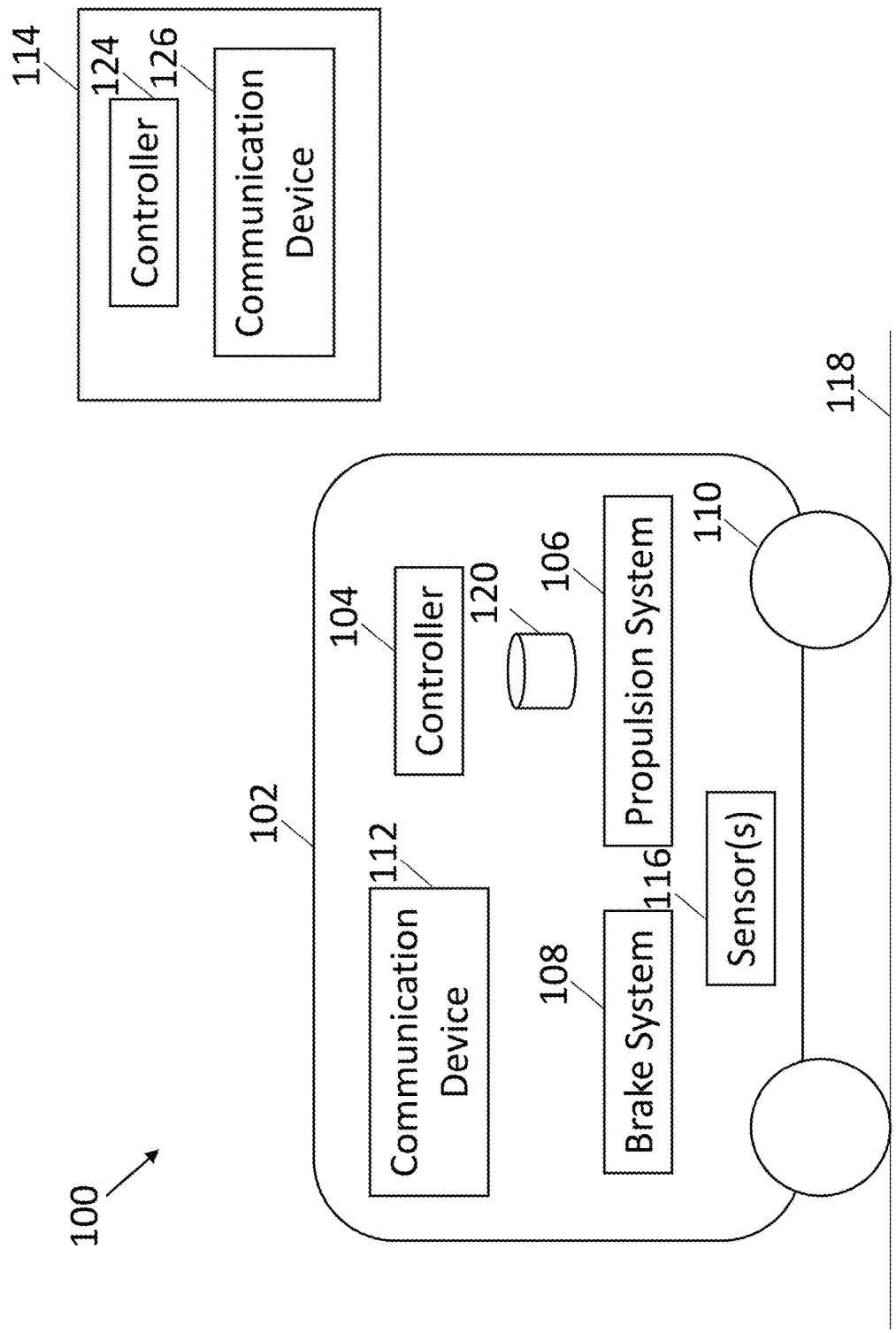
FIG. 1 illustrates one example of a vehicle control system.

FIG. 1 illustrates one example of a vehicle control system 100. The control system includes one or more components disposed onboard a vehicle 102, but optionally may include one or more components that are off-board the vehicle. The vehicle is shown as a single vehicle, but optionally may include two or more vehicles traveling together. These vehicles may be mechanically connected with each other (e.g., by one or more couplers) or may be logically connected without any mechanical connection. For example, the vehicles can be separate but communicate with each other to coordinate their movements so that the vehicles move together (e.g., as a convoy). A single vehicle or multiple vehicles may be referred to as a vehicle system.

The control system includes an onboard controller 104 that represents hardware circuitry that includes and/or is connected with one or more processors (e.g., one or more microprocessors, field programmable gate arrays, integrated circuits, or the like) that perform the operations described herein in connection with the onboard controller. The onboard controller can communicate with one or more of a propulsion system 106 and/or a brake system 108 of the vehicle to control or change movement of the vehicle. The propulsion system represents one or more motors, engines, alternators, generators, or the like, that perform work to rotate one or more wheels 110 of the vehicle. The brake system represents components that operate to slow or stop movement of the vehicle, such as one or more motors of the propulsion system (e.g., via dynamic or regenerative braking), friction brakes, air brakes, or the like.

An onboard communication device 112 includes transmitting and/or transceiving circuitry and associated hardware (e.g., transceivers, receivers, modems, antennas, etc.) for communicating with components that are off-board the vehicle. For example, the onboard controller can receive and/or send communication signals to other vehicles, to an off-board vehicle management system 114, and the like, using the communication device. The control system includes one or more sensors 116 that output information or data representative of a moving speed of the vehicle (or that can be used to calculate the moving speed of the vehicle). The moving speed of the vehicle can be the rate at which the vehicle moves along the surface of a route 118 on which the vehicle is moving. In one example, the sensor(s) include a tachometer coupled with at least one of the wheels for measuring rotational speeds of the wheel. Optionally, the sensor(s) can include a GNSS receiver (e.g., a global positioning satellite, or GPS, receiver) or other device that outputs data indicative of the moving speed of the vehicle. The onboard control system optionally includes a tangible and non-transitory computer readable medium (e.g., a memory 120, such as a computer hard drive, server, removable disk, or the like).

The off-board vehicle management system can be referred to as an off-board control system, and can include an off-board controller 124 and an off-board communication device 126. The off-board controller can be similar to the onboard controller (e.g., can include hardware circuitry and/or processor(s) and the off-board communication device can be similar to the onboard communication device (e.g., can include transceiving hardware). The off-board controller can issue (e.g., communicate) movement restrictions to the vehicle and other vehicles. These movement restrictions can be speed limits, movement authorities (e.g., permissions for vehicles to enter into or travel within various segments of the routes), work zones (e.g., areas or portions of a route undergoing repair or maintenance and where a reduced speed limit may be appliable), positions of switches in the route, etc. These movement restrictions can be communicated from the off-board controller to the vehicle and other vehicles via the off-board communication device.

In one embodiment, the off-board control system represents or includes a back office system of a PTC system and the onboard controller can automatically restrict or change operation of the propulsion system and/or brake system to ensure that the vehicle moves according to the movement restrictions received from the back office system. For example, the onboard controller can reduce throttle settings, reduce motor speeds, and/or change brake settings to prevent the vehicle from moving faster than a speed limit, entering into a segment of the route that is occupied by another vehicle, or the like. Optionally, the off-board control system represents or includes a positive vehicle control system that communicates the movement restrictions to the onboard controller. For example, the off-board control system may be similar to a PTC system but for non-rail vehicles. Absent receiving a signal from the off-board control system, the onboard controller may not permit the propulsion system and/or brake system to operate in a manner that would violate a restriction or allow the vehicle to enter into another route segment. For example, the onboard controller may engage the brake system or prevent the propulsion system from moving the vehicle into a route segment (unless or until a signal is received indicating that the route segment is unoccupied from the off-board control system).

Alternatively, the off-board control system represents or includes a negative vehicle control system that sends signals to the onboard controller to direct where the vehicle cannot move and/or how the vehicle cannot operate. For example, in contrast to the positive control system (e.g., PTC system) described above, the onboard controller can allow the vehicle to move unless or until a signal is received from the off-board control system that directs the vehicle to not move in that way (e.g., to not enter into a route segment).

Optionally, the onboard controller can control movement of the vehicle without reliance on signals communicated from the off-board control system. For example, the onboard controller can automatically control movement of the vehicle or control movement of the vehicle based on operator input but without movement restrictions from the off-board control system.

The onboard controller can receive output from the sensor(s) to calculate the moving speed of the vehicle. For example, the onboard controller can receive rotational speeds of a wheel from the sensor(s) and calculate a moving speed of the vehicle using the rotational speeds. The moving speeds can be calculated by multiplying one or more rotational speeds (e.g., each rotational speed, an average or median of several rotational speeds, etc.) by the circumference of the wheel (which may be measured and/or input to the memory or the onboard controller). The onboard controller can repeatedly measure or sample the rotational speeds measured by the sensors, calculate the moving speeds of the vehicle using the rotational speeds, and control the propulsion system and/or brake system based on the moving speeds that are calculated and the movement restrictions issued by the off-board control system.

As described above, during slippage of a wheel on the route surface, the wheel may rotate faster than the wheel should rotate to cause the vehicle to move at the current moving speed of the vehicle. During sliding of the wheel on the route surface, the wheel may rotate slower than the wheel should rotate to cause the vehicle to move at the current moving speed of the vehicle. The onboard controller can compare the measured rotational speeds of a wheel and/or changes in the rotational speeds of the vehicle with one or more thresholds to determine whether the measured rotational speed is accurate or inaccurate beyond a determined threshold of accuracy and/or precision, referred to herein as being reliable or unreliable. For example, if a measured rotational speed increases or decreases (relative to one or more preceding measured rotational speeds, such as the prior or prior set of measured rotational speeds) by more than a threshold amount, the onboard controller can determine that this significantly increased or decreased rotational speed is inaccurate or unreliable. The threshold may be a fixed value (such as a 20% change, a 30% change, or the like, in different embodiments) or can change. For example, the threshold change can vary based on the moving speed of the vehicle. Faster moving speeds of the vehicle may use larger threshold changes, while slowing moving speeds of the vehicle may use smaller threshold changes.

If a rotational speed is identified by the onboard controller as being inaccurate or unreliable, then the onboard controller may not use that inaccurate or unreliable rotational speed to calculate the moving speed of the vehicle. As a result, an inaccurate or unreliable moving speed is not calculated or used to control or change movement of the vehicle (to abide by the movement restriction(s) issued by the off-board control system and/or for automatic control of the vehicle). Instead, the onboard controller can estimate a rotational speed of the slipping or sliding wheel and then use the estimated rotational speed to calculate the moving speed of the vehicle (and use the moving speed to control operation of the propulsion system and/or brake system).

In one embodiment, the onboard controller may rely on accurate or reliable rotational speeds to continue controlling the propulsion system and/or brake system. For example, if the rotational speed reported by the sensor varies too much and is identified as unreliable or inaccurate, then the onboard controller may deactivate automated control of the propulsion system and/or brake system, or may otherwise not continue to control or restrict operation of the vehicle. As a result, operation of the vehicle may be suboptimal.

Rather than merely determining that the rotational speed of a wheel during a slip event or slide event is unreliable or inaccurate and then not using the unreliable or inaccurate rotational speed, the onboard controller can calculate and use one or more estimated values of the rotational speed to replace or supplant the unreliable or inaccurate rotational speed samples. The onboard controller can estimate the rotational speed and generate or calculate an uncertainty limit to bound the estimated rotational speed (e.g., +/−5%, +/−0.005 revolutions per second, etc.). This estimated rotational speed (and optionally the uncertainty limit) can be used during the wheel slip or wheel slide event to calculate the moving speed of the vehicle and can allow the onboard controller to continuing automatic control of the propulsion system and/or brake system without interruption.

Figure 2:
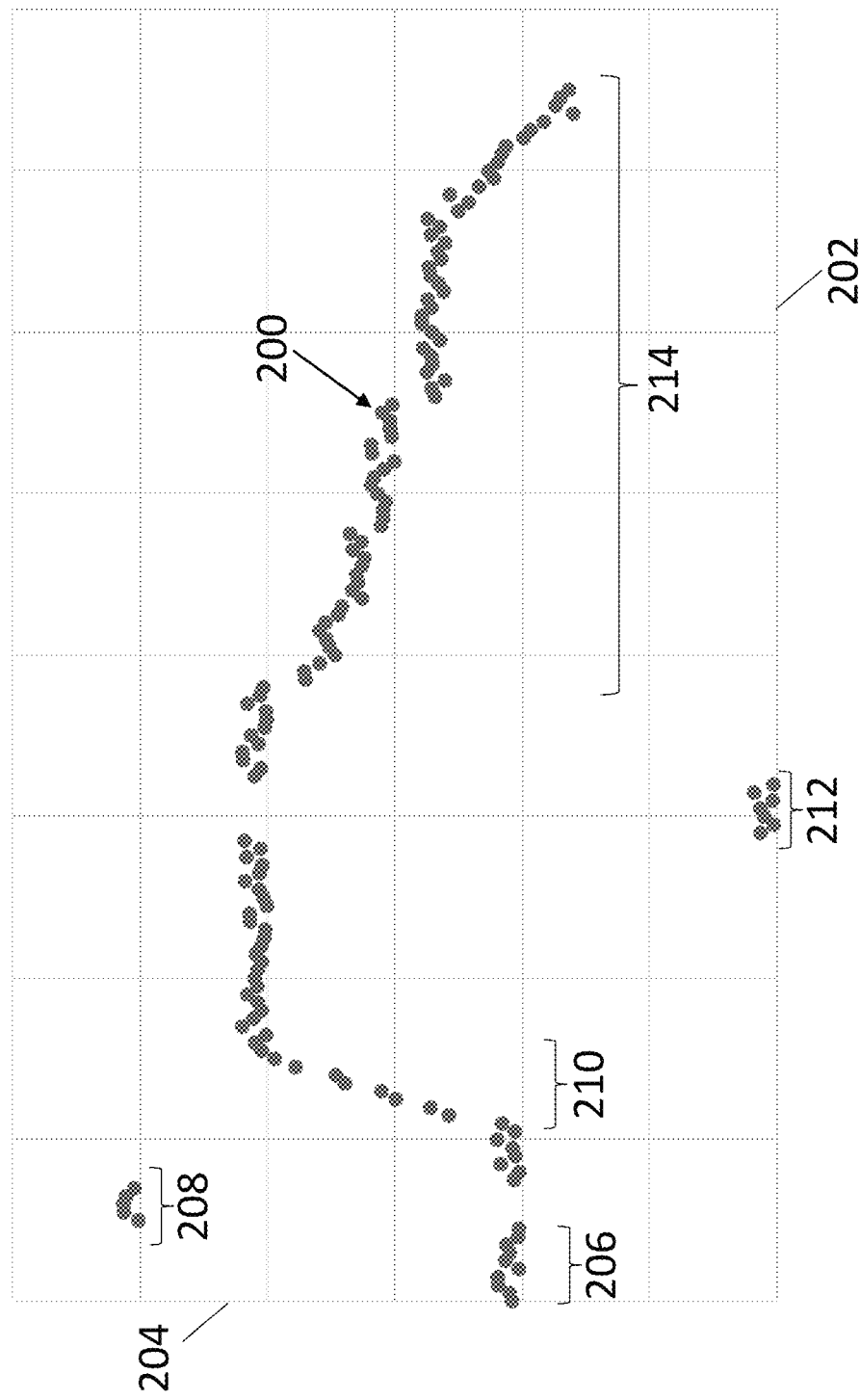
FIG. 2 illustrates examples of rotational speeds measured by sensor(s) of a control system shown in FIG. 1.

FIG. 2 illustrates examples of rotational speeds 200 measured by the sensor(s) of the control system shown in FIG. 1. The rotational speeds are shown alongside a horizontal axis 202 representative of time or number of samples or measurements of the rotational speeds. The rotational speeds also are shown alongside a vertical axis 204 representative of magnitudes of the rotational speeds. As shown, the rotational speeds are initially consistent with minor variations (e.g., variations less than the threshold described above) within a first set 206 of the rotational speeds. A first aberrant or outlier set 208 of the rotational speeds significantly deviates from the rotational speeds before the prior rotational speeds. For example, the rotational speeds within this first aberrant or outlier set may increase by more than the threshold amount described above. This can indicate (and/or be used to detect) wheel slip of a wheel of the vehicle.

The onboard controller can determine that the rotational speeds in the first aberrant or outlier set are inaccurate or unreliable rotational speeds due to the significant change in the rotational speeds. Instead of calculating the moving speed of the vehicle using the rotational speeds in the first aberrant or outlier set, the onboard controller can estimate rotational speeds for use in place of the rotational speeds in the first aberrant or outlier set. For example, the controller can use some or all of the rotational speeds in the first set (that precedes or immediately precedes the rotational speeds in the first aberrant set) and extrapolate the estimated speeds using (some or all of) the rotational speeds in the first set. These estimated rotational speeds can be used to calculate the moving speed of the vehicle (instead of using the rotational speeds in the first outlier set).

The rotational speeds in an increasing set 210 change (e.g., increase over or with respect to time), but may not include any unreliable or inaccurate rotational speeds. For example, although the rotational speeds are increasing, the rotational speeds do not vary (e.g., increase or decrease) by more than a threshold amount relative to one or more prior rotational speeds. As a result, the onboard controller may not identify any unreliable or inaccurate rotational speeds even though the speed of the vehicle is increasing.

The onboard controller can later identify a second aberrant or outlier set 212 of the rotational speeds that significantly deviates from the prior rotational speeds. For example, the rotational speeds within this second aberrant or outlier set may decrease by more than the threshold amount described above. This can indicate (and/or be used to detect) sliding of a wheel of the vehicle. The onboard controller can determine that the rotational speeds in the second aberrant or outlier set are inaccurate or unreliable rotational speeds due to the significant change in the rotational speeds. Instead of calculating the moving speed of the vehicle using the rotational speeds in the second aberrant or outlier set, the onboard controller can estimate rotational speeds for use in place of the rotational speeds in the second aberrant or outlier set. For example, the controller can use some or all of the rotational speeds prior to the second outlier set and extrapolate the estimated speeds using (some or all of) the prior rotational speeds. These estimated rotational speeds can be used to calculate the moving speed of the vehicle (instead of using the rotational speeds in the second outlier set).

The rotational speeds in a decreasing set 214 change (e.g., decrease over or with respect to time), but may not include any unreliable or inaccurate rotational speeds. For example, although the rotational speeds are decreasing, the rotational speeds do not vary (e.g., increase or decrease) by more than a threshold amount relative to one or more prior rotational speeds. As a result, the onboard controller may not identify any unreliable or inaccurate rotational speeds even though the speed of the vehicle is decreasing.

In one example, the rotational speeds may be measured or sampled at a reoccurring rate, such as at a rate of one or two hertz. If a wheel slip or slide is identified (as described above), then the onboard controller can estimate values of the rotational speeds within the samples that are outliers by extrapolating the previous N samples or measurements. The value of N can vary or be manually set, or may include those samples or measurements obtained during a prior time window (e.g., five seconds or another duration). The previous samples or measurements used in the extrapolation can include measured rotational speeds, estimated rotational speeds, or a combination of both measured and estimated rotational speeds. The estimated rotational speeds may then be used in place of the unreliable rotational speeds. The estimated rotational speeds also can be referred to as replacement rotational speeds.

Optionally, the onboard controller can calculate rotational speeds to replace inaccurate or unreliable rotational speeds using a predictive model. The rotational speeds calculated using the predictive model can be referred to as predicted rotational speeds. The predictive model can be stored in the memory and used by the onboard controller to predict the rotational speeds. The model considers (or includes) values of parameters that impact the moving speed of the vehicle. Examples of these parameters include the grade of the route, the curvature of the route, the weight of the vehicle, the number of vehicles in a multi-vehicle system (where the vehicle is included in the multi-vehicle system), the weight of the multi-vehicle system (where the vehicle is included in the multi-vehicle system), the power (e.g., horsepower) of the propulsion system that rotates the wheels of the vehicle, previous rotational speeds of the vehicle (e.g., that are not identified as unreliable or inaccurate), forces exerted on the route and/or vehicle (e.g., tractive forces generated by the propulsion system and/or brake system), weather conditions (e.g., precipitation and/or an amount of precipitation, temperature, wind, and the like), etc. By inputting values of these parameters into the model, the onboard controller can calculate the predicted rotational speeds. The model can be created to output the predicted rotational speeds that the sensor(s) would have measured but for the wheel slide event or the wheel slip event. Additionally or alternatively, the model can be created to output the predicted rotational speeds that the sensor(s) would or should output in the future.

The model can be created based on prior travels of the vehicle. For example, during prior trips of the same vehicle, other vehicles, and/or other multi-vehicle systems, the rotational speeds that are measured over different route grades, through different route curves, and the like (e.g., for a variety of other values of the parameters in a model), the values of the parameters may be recorded, along with measured rotational speeds that are not identified as unreliable or inaccurate. The model can be created such that inputting the same parameter values would result in the same or approximately the same (e.g., within 1%, within 3%, within 5%, or the like) rotational speeds would be predicted as were actually measured during the prior trips (outside of or not including the unreliable or inaccurate rotational speeds).

The model can assume changes in forces created by the wheel slip or wheel slide event. For example, the forces the vehicle (or other vehicles in a multi-vehicle system) are creating, such as tractive forces or braking forces. The model can assume that during a slip event, the vehicle is unable to generate tractive forces, so those parameters would be assumed to be zero in the model. In a slide event, the wheels may have locked up and the model can include dynamic friction between the wheel and route surface caused by the slide event (and no more other forces, such as no tractive forces).

As described above, the predicted rotational speeds calculated from the model can be used to replace or supplant the inaccurate or unreliable rotational speeds. Like the estimated rotational speeds, the predicted rotational speeds can be referred to as replacement rotational speeds and used to calculate moving speeds of the vehicle. The onboard controller optionally can both estimate and predict rotational speeds, and use the more conservative of the estimated and predicted rotational speeds to calculate one or more moving speeds. The more conservative of these speeds can be the slower of the speeds, the speed that is closer to the prior reliable speed, or the like.

The onboard controller can determine uncertainties or confidence boundaries of the replacement rotational speeds. For example, the onboard controller can calculate the confidence interval for the extrapolation of the estimated rotational speeds and/or the prediction of the predicted replacement speeds from the model. The confidence interval can be a 95% confidence interval or another confidence interval, and can be used as at least one basis for a determination of reliability of the accuracy and/or precision.

The replacement rotational speed and, optionally, the confidence interval of the replacement rotational speed can be used to calculate the moving speed of the vehicle (optionally along with a corresponding confidence interval for the calculated moving speed). This calculated moving speed can be compared with one or more other moving speeds of the vehicle to determine whether the calculated moving speed is accurate or reliable. For example, the sensors of the vehicle can include a GNSS receiver or another speed sensor that outputs the moving speed of the vehicle. If the moving speed of the vehicle from another sensor is outside of the confidence interval of the calculated moving speed, then the onboard controller may determine that the calculated moving speed is inaccurate or unreliable. The onboard controller may then no longer use that calculated moving speed to determine whether to continue automated control of movement of the vehicle and/or no longer use the calculated moving speed in addition to signals received from the off-board system to control or restrict movement of the vehicle.

As another example, the onboard controller may not estimate or predict more than 33% of the most recent samples of the rotational speeds (e.g., x/y is ⅓), or another percentage). If the number of unreliable or inaccurate rotational speeds for which the onboard controller would otherwise calculate replacement rotational speeds would exceed this value or threshold (e.g., no more than x replacement rotational speeds within the previous y measured rotational speeds), then the onboard controller may terminate one or more functions that rely on the moving speeds that are calculated from the rotational speeds (e.g., automated control, restrict movement based on signals received from the off-board control system, etc.).

The onboard controller optionally can bound the rotational speeds output by the sensor based on numerical factors. For example, if a replacement rotational speed is no faster than a product of a factor (e.g., 1.5) and the measured rotational speed (that was inaccurate or unreliable), then the onboard controller may use the replacement rotational speed to calculate the moving speed. Otherwise, if the replacement rotational speed is faster than the product of the factor and the measured rotational speed, then the onboard controller may not use the replacement rotational speed to calculate the moving speed (or may terminate one or more functions that rely on the moving speeds that are calculated from the rotational speeds).

As another example, if a replacement rotational speed is no slower than a product of another factor (e.g., 0.5) and the measured rotational speed (that was inaccurate or unreliable), then the onboard controller may use the replacement rotational speed to calculate the moving speed. Otherwise, if the replacement rotational speed is slower than the product of the factor and the measured rotational speed, then the onboard controller may not use the replacement rotational speed to calculate the moving speed (or may terminate one or more functions that rely on the moving speeds that are calculated from the rotational speeds).

In another example, if a replacement rotational speed is no faster than a product of a factor and a prior measured rotational speed (e.g., the most recent measured rotational speed that was not found to be inaccurate or unreliable), then the onboard controller may use the replacement rotational speed to calculate the moving speed. Otherwise, if the replacement rotational speed is faster than the product of the factor and the prior measured rotational speed, then the onboard controller may not use the replacement rotational speed to calculate the moving speed (or may terminate the one or more functions that rely on the moving speeds).

Optionally, if a replacement rotational speed is no slower than a product of a factor and the prior measured rotational speed, then the onboard controller may use the replacement rotational speed to calculate the moving speed. Otherwise, if the replacement rotational speed is slower than the product of the factor and the prior measured rotational speed, then the onboard controller may not use the replacement rotational speed to calculate the moving speed (or may terminate the one or more functions that rely on the moving speeds).

The factors can include an upper factor (e.g., 1.5) and a lower factor (e.g., 0.5). The value of these factors can vary. For example, the upper and/or lower factor may have values that are farther apart (e.g., the upper factor increases in value and/or the lower factor decreases in value) as the length of time that the vehicle operates increases, as the moving speed of the vehicle increases, as the sampling rate at which the rotational speeds are measured increases, or the like. Conversely, the upper and/or lower factor may have values that are closer together (e.g., the upper factor decreases in value and/or the lower factor increases in value) as the length of time that the vehicle operates is shorter, as the moving speed of the vehicle decreases, as the sampling rate at which the rotational speeds are measured decreases, or the like.

While the description focuses on use of a wheel tachometer to measure rotational speeds of the vehicle, optionally, one or more embodiments of the subject matter described herein can relate to examining speeds (rotational or moving speeds) obtained by another type of sensor, determining whether any of these speeds are inaccurate or unreliable, and estimating or predicting replacement speeds for use in controlling movement of the vehicle responsive to one or more of the measured speeds being inaccurate or unreliable.

Figure 3:
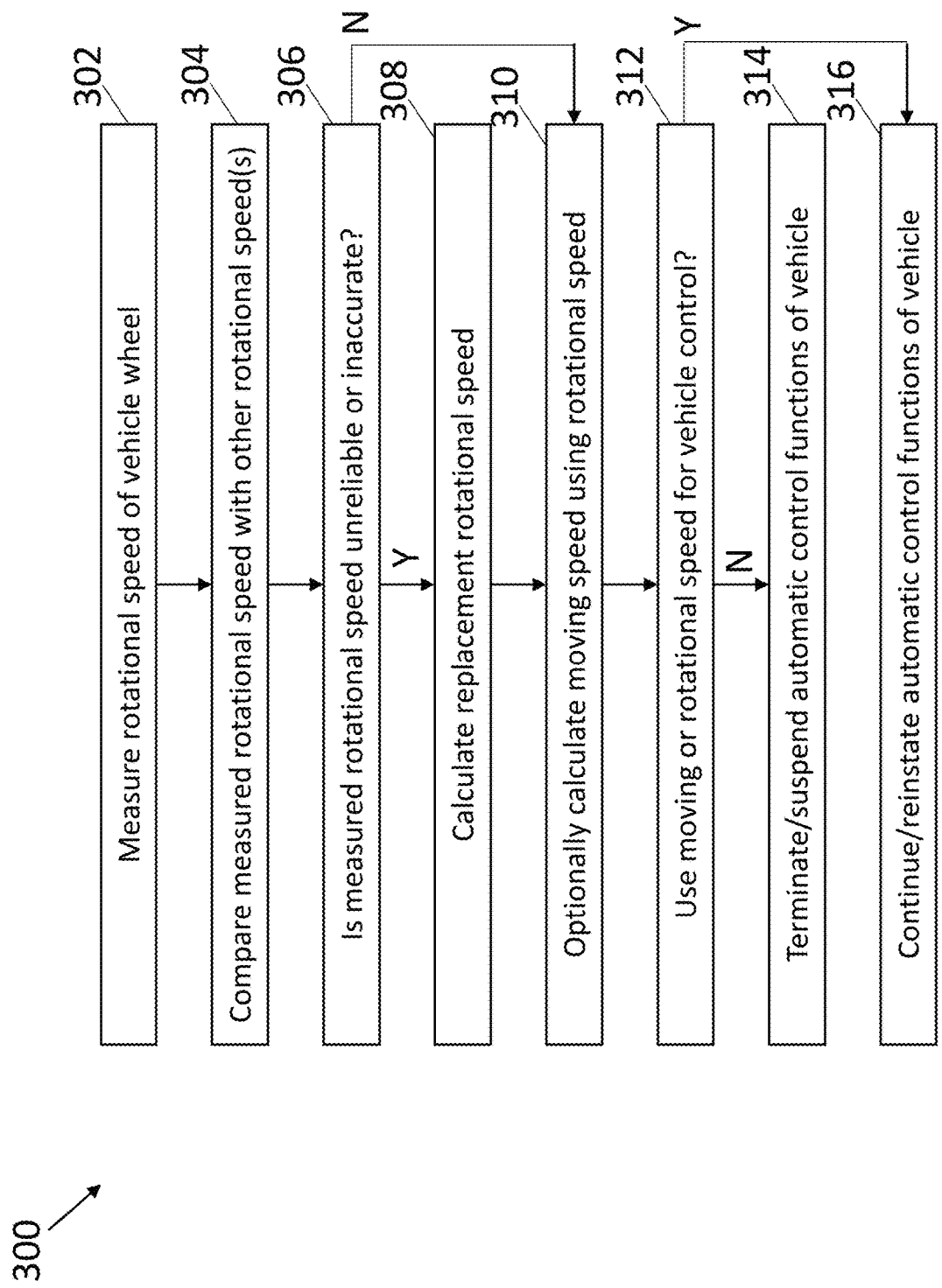
FIG. 3 illustrates a flowchart of one example of a method for controlling movement of a vehicle.

FIG. 3 illustrates a flowchart of one example of a method 300 for controlling movement of a vehicle. The method can represent operations performed by the onboard controller of the vehicle control system described herein. At step 302, a rotational speed of a wheel of a vehicle is measured. The rotational speed can be measured by a sensor such as a tachometer. At step 304, the rotational speed that is measured at step 302 is compared with one or more other rotational speeds. For example, the rotational speed that was measured at step 302 can be compared to the last rotational speed that was measured, another rotational speed that was previously measured, an average or median of previously measured rotational speeds, etc. At step 306, a decision is made as to whether the rotational speed measured at step 302 is unreliable or inaccurate based on the comparison performed at step 304. For example, if the measured rotational speed deviates from the prior rotational speeds by more than a threshold amount, then the rotational speed measured at step 302 may be identified as unreliable or inaccurate. As a result, flow of the method can proceed toward step 308. But if the measured rotational speed does not deviate from the prior rotational speeds by more than the threshold amount, then the rotational speed measured at step 302 may be identified as reliable or accurate. As a result, flow of the method can proceed toward step 310.

At step 308, a replacement rotational speed is calculated. As described above, the rotational speed can be estimated or predicted and used to replace or otherwise supplant the unreliable or inaccurate rotational speed. At step 310, a moving speed of the vehicle can be calculated using the rotational speed. For example, the measured rotational speed found to be accurate or reliable at step 306 can be used to calculate the moving speed or the replacement rotational speed that is estimated or predicted at step 308 can be used to calculate the moving speed.

At step 312, a decision is made as to whether the rotational speed that is measured or calculated can be used for automated control of the vehicle. For example, the onboard controller can calculate the moving speed and use this moving speed to automatically control speeds, braking, or the like, of the vehicle. As another example, the onboard controller can use movement restrictions communicated from the off-board control system (e.g., movement authorities, speed restrictions, etc.) and the calculated moving speed to automatically control or restrict movement of the vehicle. If the rotational speed (estimated, predicted, or measured) and/or the moving speed are outside of a confidence interval, are outside of bounds defined or calculated by the onboard controller, and/or deviate from a rotational speed or moving speed obtained from another source (e.g., another sensor) by more than a threshold amount, then the rotational speed and/or moving speed may not be used to automatically control or restrict movement of the vehicle. As a result, flow of the method can proceed toward step 314. But if the rotational speed (estimated, predicted, or measured) and/or the moving speed are within the confidence interval, are within the bounds defined or calculated by the onboard controller, and/or do not deviate from the rotational speed or moving speed obtained from another source by more than the threshold amount, then the rotational speed and/or moving speed may be used to automatically control or restrict movement of the vehicle. As a result, flow of the method can proceed toward step 316.

At step 314, one or more functions of the onboard controller to automatically control or restrict movement of the vehicle are terminated or suspended. For example, the onboard controller may no longer automatically control speeds, accelerations, decelerations, or the like, and/or the onboard controller may no longer automatically control the vehicle to move according to signals received from the off-board control system. This may continue for a threshold period of time (e.g., ninety seconds) or until additional measured, predicted, or estimated rotational speeds (and/or the corresponding moving speeds calculated based off the rotational speeds) are within the confidence interval, are within the bounds defined or calculated by the onboard controller, and/or do not deviate from the rotational speed or moving speed obtained from another source by more than the threshold amount. Flow of the method can return to one or more other operations, such as step 302.

At step 316, automated control of the vehicle may continue. For example, the onboard controller may continue to automatically control speeds, accelerations, decelerations, or the like, and/or the onboard controller may continue automatically controlling the vehicle to move according to signals received from the off-board control system using the moving speed that is calculated. Flow of the method can return to one or more other operations, such as step 302.

In one embodiment, a system is provided that includes a controller that may be configured to receive one or more measured rotational speeds of a wheel of a vehicle. The controller may be configured to determine whether the one or more measured rotational speeds are unreliable relative to one or more previous rotational speeds of the wheel of the vehicle. The controller may be configured to calculate a replacement rotational speed of the wheel and use the replacement rotational speed of the wheel to control or restrict movement of the vehicle using or based on the replacement rotational speed in place of the one or more measured rotational speeds.

The controller may be configured to determine that the one or more measured rotational speeds are unreliable responsive to comparing the one or more measured rotational speeds to the one or more previous rotational speeds and calculating a deviation of the one or more measured rotational speeds from the one or more previous rotational speeds that exceeds a threshold. The controller may be configured to identify one or more of a wheel slip event or a wheel slide event of the wheel of the vehicle responsive to determining that the one or more measured rotational speeds are unreliable relative to the one or more previous rotational speeds of the wheel of the vehicle.

The controller may be configured to calculate the replacement rotational speed of the wheel by extrapolating the replacement rotational speed from two or more of the previous rotational speeds. The controller may be configured to calculate the replacement rotational speed of the wheel using a predictive model that includes one or more parameters indicative of movement of the vehicle. The one or more parameters of the predictive model may include one or more of a grade of a route, curvature of the route, weight of the vehicle, power of a propulsion system that rotates the wheel of the vehicle, the one or more previous rotational speeds of the vehicle, a force exerted on the route by the vehicle, and/or a weather condition. The controller may be configured to use the replacement rotational speed of the wheel to automatically control or restrict the movement of the vehicle using signals received from one or more of an off-board positive vehicle control system or an off-board negative vehicle control system.

In one embodiment, a method includes determining whether the one or more measured rotational speeds are unreliable relative to one or more previous rotational speeds of the wheel of the vehicle, calculating a replacement rotational speed of the wheel, and controlling or restricting movement of the vehicle using or based on the replacement rotational speed in place of the one or more measured rotational speeds that were determined to be unreliable.

The one or more measured rotational speeds may be determined to be unreliable by comparing the one or more measured rotational speeds to the one or more previous rotational speeds and calculating a deviation of the one or more measured rotational speeds from the one or more previous rotational speeds that exceeds a threshold. The replacement rotational speed of the wheel may be calculated by extrapolating the replacement rotational speed from two or more of the previous rotational speeds.

The replacement rotational speed of the wheel may be calculated using a predictive model that includes one or more parameters indicative of movement of the vehicle. The one or more parameters of the predictive model may include one or more of a grade of a route, curvature of the route, weight of the vehicle, power of a propulsion system that rotates the wheel of the vehicle, the one or more previous rotational speeds of the vehicle, a force exerted on the route by the vehicle, and/or a weather condition.

The method also may include identifying one or more of a wheel slip event or a wheel slide event of the wheel of the vehicle responsive to determining that the one or more measured rotational speeds are unreliable relative to the one or more previous rotational speeds of the wheel of the vehicle. The replacement rotational speed of the wheel may be used to automatically control or restrict the movement of the vehicle using signals received from one or more of an off-board positive vehicle control system or an off-board negative vehicle control system.

In one embodiment, another system includes a controller that may be configured to receive one or more measured rotational speeds of a wheel of a vehicle. The controller may be configured to determine whether a deviation between the one or more measured rotational speeds and one or more previous rotational speeds of the wheel of the vehicle exceeds a threshold. The controller may be configured to calculate a replacement rotational speed of the wheel and use the replacement rotational speed of the wheel to automatically control or restrict movement of the vehicle using or based on the replacement rotational speed in place of the one or more measured rotational speeds that were determined to be unreliable.

The controller may be configured to calculate the replacement rotational speed of the wheel by extrapolating the replacement rotational speed from two or more of the previous rotational speeds. The controller may be configured to calculate the replacement rotational speed of the wheel using a predictive model that includes one or more parameters indicative of movement of the vehicle.

The one or more parameters of the predictive model may include one or more of a grade of a route, curvature of the route, weight of the vehicle, power of a propulsion system that rotates the wheel of the vehicle, the one or more previous rotational speeds of the vehicle, a force exerted on the route by the vehicle, and/or a weather condition.

The controller may be configured to identify one or more of a wheel slip event or a wheel slide event of the wheel of the vehicle responsive to determining that the one or more measured rotational speeds are unreliable relative to the one or more previous rotational speeds of the wheel of the vehicle. The controller may be configured to use the replacement rotational speed of the wheel to automatically control or restrict the movement of the vehicle using signals received from one or more of an off-board positive vehicle control system or an off-board negative vehicle control system.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
a controller configured to receive one or more measured rotational speeds of a wheel of a vehicle, the controller configured to determine whether the one or more measured rotational speeds are unreliable relative to one or more previous rotational speeds of the wheel of the vehicle, the controller configured to calculate a replacement rotational speed of the wheel and use the replacement rotational speed of the wheel to control or restrict movement of the vehicle using or based on the replacement rotational speed in place of the one or more measured rotational speeds.

2. The system of claim 1, wherein the controller is configured to determine that the one or more measured rotational speeds are unreliable responsive to (a) comparing the one or more measured rotational speeds to the one or more previous rotational speeds, (b) calculating a deviation of the one or more measured rotational speeds from the one or more previous rotational speeds, and (c) determining that the deviation exceeds a threshold.

3. The system of claim 2, wherein the controller is configured to identify one or more of a wheel slip event or a wheel slide event of the wheel of the vehicle responsive to determining that the one or more measured rotational speeds are unreliable relative to the one or more previous rotational speeds of the wheel of the vehicle.

4. The system of claim 1, wherein the controller is configured to calculate the replacement rotational speed of the wheel by extrapolating the replacement rotational speed from two or more of the previous rotational speeds.

5. The system of claim 1, wherein the controller is configured to calculate the replacement rotational speed of the wheel using a predictive model that includes one or more parameters indicative of movement of the vehicle.

6. The system of claim 5, wherein the one or more parameters of the predictive model include one or more of a grade of a route, a curvature of the route, a weight of the vehicle, a power of a propulsion system that rotates the wheel of the vehicle, a force exerted on the route by the vehicle, or a weather condition.

7. The system of claim 1, wherein the controller is configured to use the replacement rotational speed of the wheel to automatically control or restrict the movement of the vehicle using signals including speed limits received from one or more of an off-board positive vehicle control system or an off-board negative vehicle control system.

8. A method comprising:
   determining whether one or more measured rotational speeds of a wheel of a vehicle are unreliable relative to one or more previous rotational speeds of the wheel of the vehicle;
   calculating a one or more replacement rotational speeds of the wheel; and
   controlling or restricting movement of the vehicle using or based on the one or more replacement rotational speeds in place of the one or more measured rotational speeds that were determined to be unreliable.

9. The method of claim 8, the one or more measured rotational speeds are determined to be unreliable by comparing the one or more measured rotational speeds to the one or more previous rotational speeds, calculating a deviation of the one or more measured rotational speeds from the one or more previous rotational speeds, and determining that the deviation exceeds a threshold.

10. The method of claim 8, wherein the one or more replacement rotational speeds of the wheel are calculated by extrapolating the one or more replacement rotational speeds from two or more of the previous rotational speeds.

11. The method of claim 8 wherein the one or more replacement rotational speeds of the wheel are calculated using a predictive model that includes one or more parameters indicative of movement of the vehicle.

12. The method of claim 11, wherein the one or more parameters of the predictive model include one or more of a grade of a route, a curvature of the route, a weight of the vehicle, a power of a propulsion system that rotates the wheel of the vehicle, a force exerted on the route by the vehicle, or a weather condition.

13. The method of claim 8, wherein the one or more replacement rotational speeds of the wheel are used to automatically control or restrict the movement of the vehicle using signals including speed limits received from one or more of an off-board positive vehicle control system or an off-board negative vehicle control system.

14. A system comprising:
   a controller configured to receive one or more measured rotational speeds of a wheel of a vehicle, the controller configured to determine whether a deviation between the one or more measured rotational speeds and one or more previous rotational speeds of the wheel of the vehicle exceeds a threshold, the controller configured to calculate a replacement rotational speed of the wheel and use the replacement rotational speed of the wheel to automatically control or restrict movement of the vehicle using or based on the replacement rotational speed in place of the one or more measured rotational speeds that were determined to be unreliable.

15. The system of claim 14, wherein the controller is configured to calculate the replacement rotational speed of the wheel by extrapolating the replacement rotational speed from two or more of the previous rotational speeds.

16. The system of claim 14, wherein the controller is configured to calculate the replacement rotational speed of the wheel using a predictive model that includes one or more parameters indicative of movement of the vehicle.

17. The system of claim 16, wherein the one or more parameters of the predictive model include one or more of a grade of a route, a curvature of the route, a weight of the vehicle, a power of a propulsion system that rotates the wheel of the vehicle, a force exerted on the route by the vehicle, or a weather condition.

18. The system of claim 14, wherein the controller is configured to identify one or more of a wheel slip event or a wheel slide event of the wheel of the vehicle responsive to determining that the one or more measured rotational speeds are unreliable relative to the one or more previous rotational speeds of the wheel of the vehicle.

19. The system of claim 14, wherein the controller is configured to use the replacement rotational speed of the wheel to automatically control or restrict the movement of the vehicle using speed limits received from one or more of an off-board positive vehicle control system or an off-board negative vehicle control system.

20. The method of claim 9, further comprising:
   changing the threshold based on a moving speed of the vehicle along a route.

* * * * *